(12) United States Patent
Chen

(10) Patent No.: US 6,939,004 B1
(45) Date of Patent: Sep. 6, 2005

(54) EASY-TO-ASSEMBLE EYEGLASSES

(76) Inventor: Lin-Yun Chen, No. 28-2, Sha Luen, Chung Sha Village, An Ting Shiang, Tainan Hsien (TW)

( * ) Notice: Subject to any disclaimer, the term of this patent is extended or adjusted under 35 U.S.C. 154(b) by 0 days.

(21) Appl. No.: 10/842,538

(22) Filed: May 11, 2004

(51) Int. Cl.[7] .............................................. G02C 1/04
(52) U.S. Cl. ......................... 351/106; 351/86; 351/133
(58) Field of Search .............................. 351/41, 44, 83, 351/86, 103–109, 130, 133

(56) References Cited

U.S. PATENT DOCUMENTS

| | | | | |
|---|---|---|---|---|
| 5,467,148 | A | * | 11/1995 | Conway ...................... 351/85 |
| 5,703,669 | A | * | 12/1997 | Park ............................ 351/86 |
| 6,280,030 | B1 | * | 8/2001 | Chen ........................... 351/86 |

* cited by examiner

Primary Examiner—Huy Mai
(74) Attorney, Agent, or Firm—Rosenberg, Klein & Lee

(57) ABSTRACT

A pair of easy-to-assembly eyeglasses includes a primary frame and a secondary frame. The primary frame includes a horizontal rod. A nose padding member extends downward from a central portion of the horizontal rod and includes two legs each defining an engaging groove. Two temples are respectively pivoted to two sides of the primary frame. The horizontal rod includes an extension extending forward and downward from an intermediate portion thereof, delimiting a downwardly facing engaging space. The secondary frame includes two rings, two lenses respectively received in the rings, and a bridge between the lenses. The bridge includes two protrusions respectively engaged with the engaging grooves of the nose padding member. The secondary frame further includes an engaging plate engaged in the downwardly facing engaging space. The secondary frame can be rapidly replaced with a desired one to match the primary frame or to provide a reading function.

1 Claim, 5 Drawing Sheets

EASY-TO-ASSEMBLE EYEGLASSES

BACKGROUND OF THE INVENTION

1. Field of the Invention

The present invention relates to a pair of eyeglasses that is easy to assemble and disassemble.

2. Description of the Related Art

Many people suffer from myopia or hyperopia due to inheritance or improper reading postures and thus have to wear a pair of eyeglasses when necessary. A typical pair of eyeglasses includes a frame, two lenses, and two temples respectively pivoted to two sides of the frame. Customers of eyeglasses consider not only functions and cost but also aesthetics. Thus, eyeglasses become one of the symbols of fashion.

SUMMARY OF THE INVENTION

In accordance with an aspect of the present invention, a pair of easy-to-assembly eyeglasses includes a primary frame and a secondary frame. The primary frame includes a horizontal rod. A nose padding member extends downward from a central portion of the horizontal rod and includes two legs each defining an engaging groove. Two temples are respectively pivoted to two sides of the primary frame. The horizontal rod includes an extension extending forward and downward from an intermediate portion thereof, delimiting a downwardly facing engaging space.

The secondary frame includes two rings, two lenses respectively received in the rings, and a bridge between the lenses. The bridge includes two protrusions respectively engaged with the engaging grooves of the nose padding member. The secondary frame further includes an engaging plate engaged in the downwardly facing engaging space.

The pair of eyeglasses in accordance with the present invention is easy to assemble and to disassemble. The secondary frame can be rapidly replaced by one with different shapes or with different lenses to match the primary frame or to provide the desired reading function, depending on the need.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
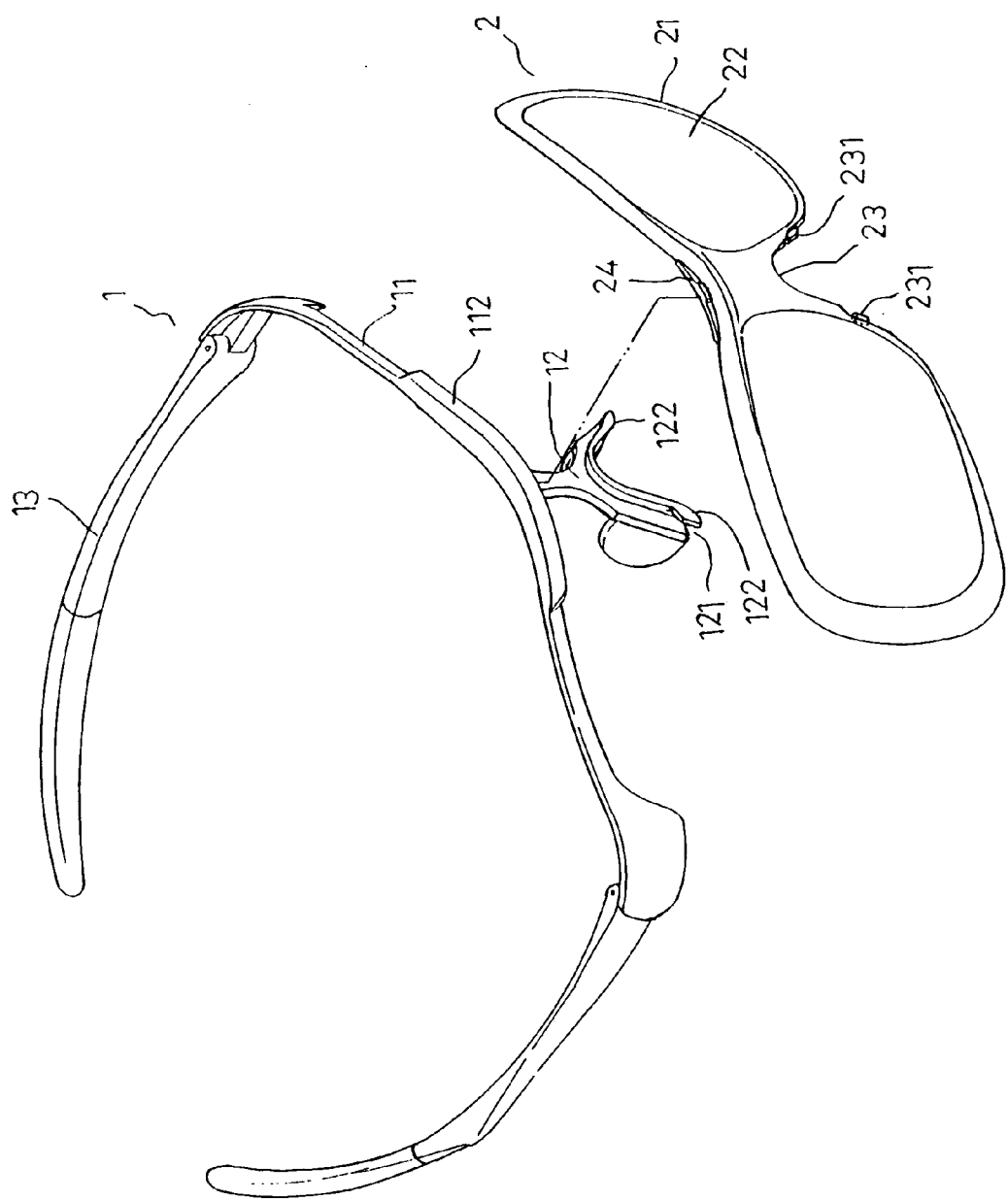
FIG. 1 is an exploded perspective view of a pair of easy-to-assemble eyeglasses in accordance with the present invention.
Figure 2:
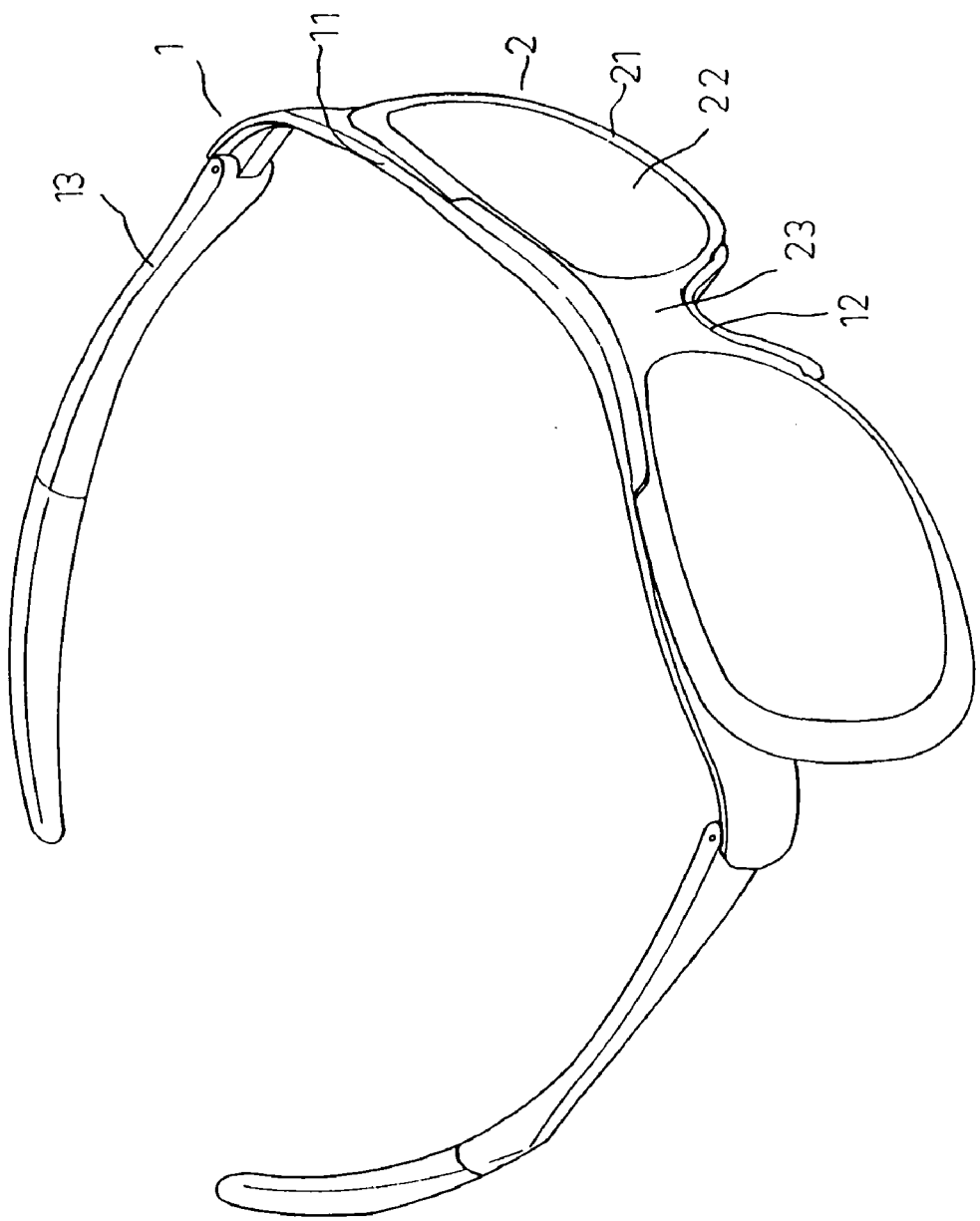
FIG. 2 is a perspective view of the pair of easy-to-assemble eyeglasses in accordance with the present invention.
Figure 3:
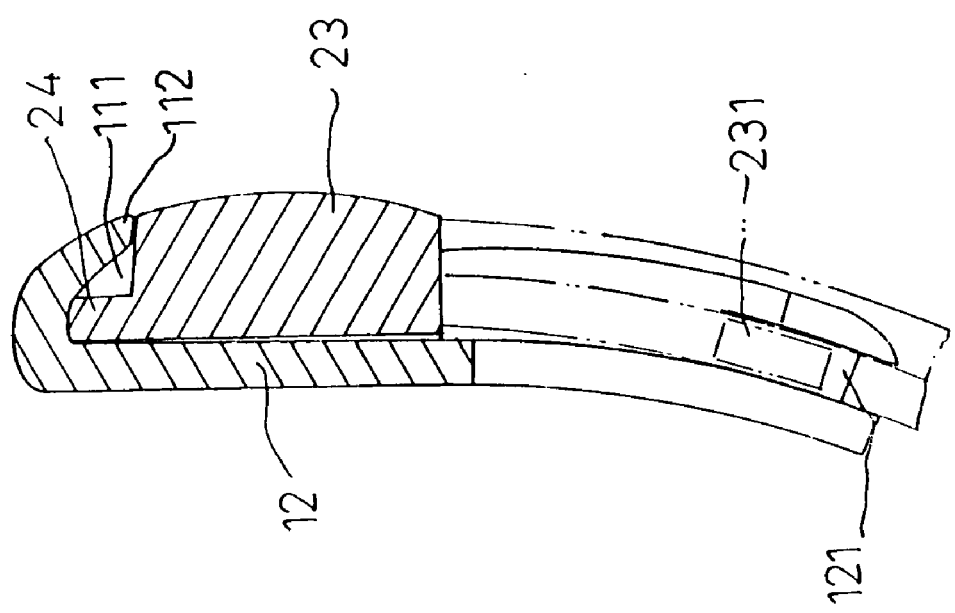
FIG. 3 is a sectional view of the pair of easy-to-assemble eyeglasses in accordance with the present invention.

Referring to FIGS. 1 through 3, a pair of easy-to-assemble eyeglasses in accordance with the present invention comprises a primary frame 1 and a secondary frame 2. The primary frame 1 includes a horizontal rod 11 having a nose padding member 12 extending downward from a middle of the horizontal rod 11. Two temples 13 are respectively pivoted to two sides of the primary frame 1. The nose padding member 12 is substantially inverted Y-shaped.

The secondary frame 2 includes two rings 21, two lens 22 respectively mounted in the rings 21, and a bridge 23 between the rings 21. The secondary frame 2 includes an engaging plate 24. Further, the bridge 23 includes two inner sides each having a protrusion 231 formed thereon.

As can be seen from FIG. 3, the primary frame 1 includes an extension 112 extending forward and outward from the intermediate portion of the horizontal rod 11, delimiting a downwardly facing engaging space 111. Further, the substantially inverted Y-shaped nose padding member 12 includes two legs 122 each having an engaging groove 121.

In assembly, as illustrated in FIG. 3, the engaging plate 24 of the secondary frame 2 is engaged with the engaging space 111 of the primary frame 1. Further, each protrusion 231 of the bridge 23 of the secondary frame 2 is engaged in an associated one of the engaging grooves 121 of the nose padding member 12. Thus, the secondary frame 2 is simply yet reliably attached to the primary frame 1 at three points.

The secondary frame 2 may be widely varied in shape, and the lenses 22 may be non-optical lenses with desired curvatures and shapes. The secondary frame 2 with lenses 22 can be rapidly replaced with one with a different shape or with different lenses to match the primary frame 1. Thus, the resultant eyeglasses may provide an aesthetically pleasing effect.

Figure 4:
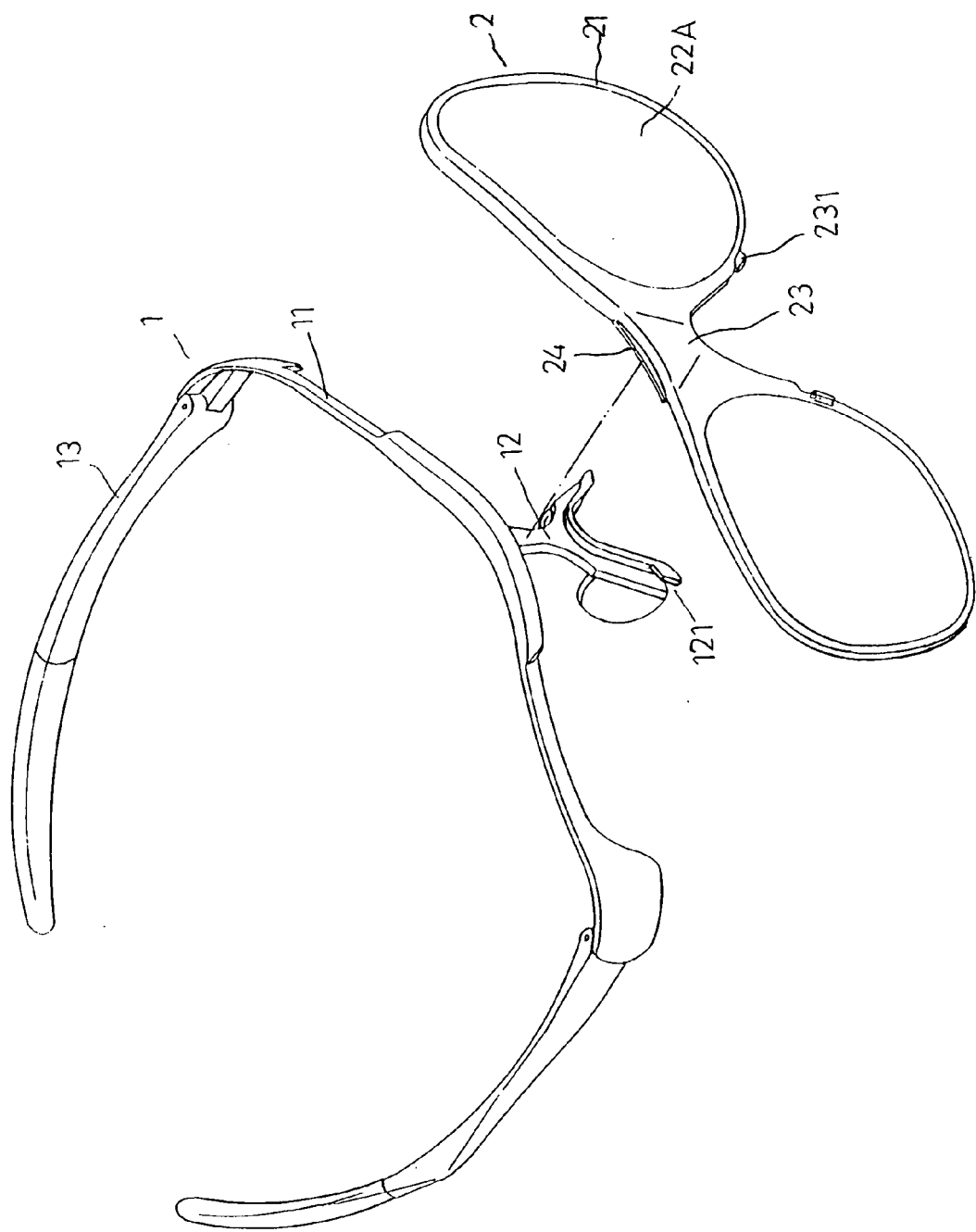
FIG. 4 is an exploded perspective view of a modified embodiment of pair of easy-to-assemble eyeglasses in accordance with the present invention.
Figure 5:
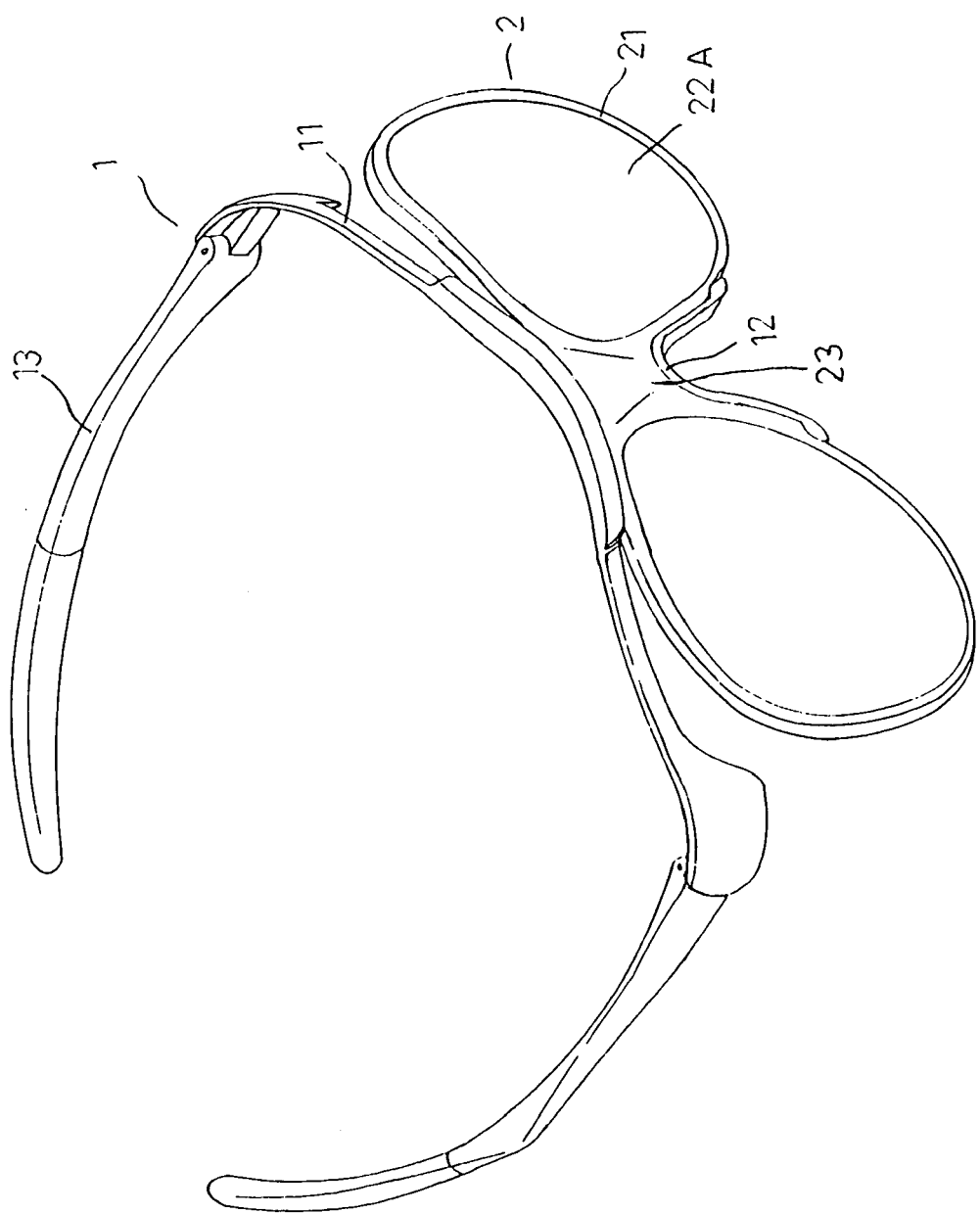
FIG. 5 is a perspective view of the modified embodiment of pair of easy-to-assemble eyeglasses in accordance with the present invention.

Referring to FIGS. 4 and 5, the secondary frame 2 can be replaced with one without much variation in shape and curvature so as to use with optical lenses 22A.

The pair of eyeglasses in accordance with the present invention is easy to assemble and to disassemble. The user may select a desired secondary frame 2 with a desired shape or with desired lenses 22, 22A to match the primary frame 1 or to provide the desired reading function, depending on the need.

Although the invention has been explained in relation to its preferred embodiment, it is to be understood that many other possible modifications and variations can be made without departing from the scope of the invention as hereinafter claimed.

What is claimed is:

1. A pair of easy-to-assemble assemble eyeglasses, comprising:
    a primary frame including (a) a horizontal rod, (b) a nose padding member extending downward from a central portion of the horizontal rod, the nose padding member including two legs each having an engaging groove formed adjacent a distal end thereof, and (c) two temples respectively pivoted to two sides of the primary frame, the horizontal rod including an extension extending forward and downward from an intermediate portion to define a downwardly facing engaging space; and
    a secondary frame including (a) two rings, (b) two lenses respectively received in the rings, (c) a bridge disposed between and joining the two rings, and (d) an engaging plate extending from an upper end of the bridge and engaged in the downwardly facing engaging space, the bridge including two distally disposed protrusions respectively engaged in the engaging grooves of the nose padding member.

* * * * *